United States Patent
Huang (10) Patent No.: US 12,184,380 B2
(45) Date of Patent: Dec. 31, 2024

(54) METHOD, SYSTEM, AND ELECTRONIC APPARATUS FOR DETECTING BEAMFORMING FAILURE

(71) Applicant: Nanning FuLian FuGui Precision Industrial Co., Ltd., Nanning (CN)

(72) Inventor: Yun-Yan Huang, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 345 days.

(21) Appl. No.: 17/840,751

(22) Filed: Jun. 15, 2022

(65) Prior Publication Data
US 2023/0128906 A1 Apr. 27, 2023

(30) Foreign Application Priority Data
Oct. 22, 2021 (CN) .......................... 202111235803.1

(51) Int. Cl.
*H04B 7/06* (2006.01)
*H04B 7/08* (2006.01)
*H04B 17/309* (2015.01)
*H04W 24/08* (2009.01)

(52) U.S. Cl.
CPC ........... *H04B 7/0695* (2013.01); *H04B 7/088* (2013.01); *H04B 17/309* (2015.01); *H04W 24/08* (2013.01)

(58) Field of Classification Search
CPC ...... H04B 7/088; H04B 7/0695; H04W 24/08
See application file for complete search history.

(56) References Cited

U.S. PATENT DOCUMENTS

| | | | |
|---|---|---|---|
| 2020/0053824 A1* | 2/2020 | He | H04B 17/309 |
| 2020/0092838 A1* | 3/2020 | Koo | H04B 7/0617 |
| 2020/0127907 A1* | 4/2020 | Koo | H04W 24/04 |
| 2021/0195674 A1* | 6/2021 | Park | H04W 76/18 |
| 2022/0078849 A1* | 3/2022 | Han | H04W 74/004 |
| 2022/0140884 A1* | 5/2022 | Shi | H04W 76/19 370/329 |
| 2022/0209843 A1* | 6/2022 | Stone | H04B 7/0408 |
| 2023/0054878 A1* | 2/2023 | Xu | H04W 24/08 |
| 2023/0118940 A1* | 4/2023 | Zhou | G06N 3/082 370/225 |
| 2024/0023160 A1* | 1/2024 | Wang | H04L 1/189 |
| 2024/0178959 A1* | 5/2024 | Xu | H04L 5/0048 |
| 2024/0236970 A1* | 7/2024 | Jiang | H04W 72/542 |

FOREIGN PATENT DOCUMENTS

CN 110167055 A 8/2019

* cited by examiner

*Primary Examiner* — Melanie Jagannathan
(74) *Attorney, Agent, or Firm* — ScienBiziP, P.C.

(57) ABSTRACT

A method, a system, and an electronic apparatus for detecting failure of beamed signals can be applied in a user equipment. The method acquires a signal quality and determines whether such signal quality reaches a threshold value. If the signal quality is determined to be reaching the threshold value, determining whether the signal quality is continuously equal to or above the threshold value. If the signal quality parameter reaches the failure threshold value, determining that the beam occurred a wave beam failure.

18 Claims, 9 Drawing Sheets

METHOD, SYSTEM, AND ELECTRONIC APPARATUS FOR DETECTING BEAMFORMING FAILURE

CROSS-REFERENCE TO RELATED APPLICATIONS

This application claims priority to Chinese Patent Application No. 202111235803.1 filed on Oct. 22, 2021, in China National Intellectual Property Administration, the contents of which are incorporated by reference herein.

FIELD

The subject matter herein generally relates to wireless communication technical field, particularly relates to a method, a system, and an electronic apparatus for beam failure detection.

BACKGROUND

In a wireless communication system, beamforming improves the coverage and capacity of the wireless communication system by reducing a signal loss or misalignment. The misalignment of beamed signals may happen due to channel fluctuation, unexpected obstacle interruption, a user equipment (UE) rotation, and other factors, and the frequent beam misalignment may lead to a wireless link failure. Therefore, a beam failure recovery technology is required to confirm whether there is a beam failure and restore a connection. Detecting a beam failure is a vital step.

At present, a beam failure detection and a mechanism to so determine in prior art will lead to an increase of a signaling overhead of the user equipment and to a network congestion.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

Figure 1:
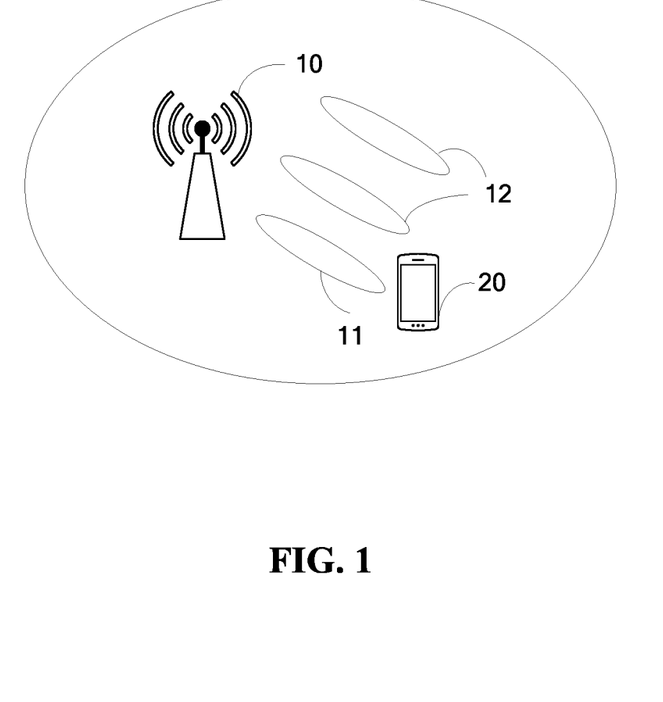
FIG. 1 is a diagram of an embodiment of a communication system according to the present disclosure.

FIG. 1 illustrates a communication system according to one exemplary embodiment of the present disclosure. As shown in FIG. 1, a base station 10 can generate multiple beams of signals with different directions to completely cover a whole cell. A user equipment 20 selects one beam with the best communication effect as a preferred communication beam out of the multiple beams. After the user equipment 20 connects to the base station 10, the base station 10 sends a wireless signal through differently-aimed beams with in sequence. The process is known as a beam sweeping (BS). Simultaneously, the user equipment 20 performs a beam measurement (BM) to measure the beams with different directions and send a beam report (BR) to the base station 10. The base station 10 performs a beam determination (BD) to determine a best beam for the user equipment 20 through the beam report.

As shown in FIG. 1, the user equipment 20 is assumed to have achieved a beam alignment with the base station 10. The user equipment 20 communicates with the base station 10 through a beam 11. During a communication process, a beam failure occurs, which leads a radio link failure (RLF) in the user equipment 20. When the RLF occurs frequently, a beam failure recovery technology needs to be applied to switch the user equipment 20 to another candidate beam, such as a candidate beam 12, to achieve the beam failure recovery.

In one embodiment of the present disclosure, the beam failure recovery technology generally includes a beam failure detection, a candidate beam confirmation, a recovery transmission requirement, and a network response to the recovery transmission requirement. Wherein, if the beam failure detection itself fails, the user equipment 20 may not be able to enter a beam recovery state quickly after a beam failure. If the intervention of the beam failure detection is too frequent, the user equipment 20 will enter the beam recovery state too frequently, resulting in a signaling overhead, and may lead to a communication network congestion.

Therefore, the present disclosure provides a system, a method, and an apparatus for detecting beam failure, which is configured for detecting the beam failure, optimizing the beam failure determination process, and avoid the user equipment overfrequently entering the beam failure recovery state.

In one embodiment of the present disclosure, the method for beam failure detection can apply to different wireless communication network, for instance, a long term evolution (LTE), a code division multiple access (CDMA), a time division multiple address (TDMA), a frequency division multiple access (FDMA), an orthogonal frequency division multiple access (OFDMA), a single carrier frequency division multiple access (SC-FDMA), and other network. The terms "network" and "system" are often used interchangeably. The CDMA network may implement a radio technology like a umts terrestrial radio access (UTRA), and a CDMA2000. The CDMA2000 covers standards including an IS-2000, an IS-95, and an IS-86. The TDMA network may implement the radio technology such as a Global System for Mobile Communications (GSM). The OFDMA network may implement radio technologies such as a new radio (NR), 5G RA, evolved UTRA (E-UTRA), ultra mobile broadband (UMB), IEEE 802.11 (Wi-Fi), IEEE 802.16 (WiMAX), IEEE 802.20, flash-OFDMA, and the like. The UTRA and the E-UTRA are part of a Universal Mobile Telecommunications System (UMTS). The NR is an emerging wireless communication technology that is developed in conjunction with 5G Technology Forum (5GTF). 3GPP Long Term Evolution (LTE) and LTE-Advanced (LTE-A) are releases of UMTS that use the E-UTRA. The UTRA, the E-UTRA, the UMTS, the LTE, the LTE-A, and the GSM are described in documents from an organization named "3rd Generation Partnership Project" (3GPP). The CDMA2000 and the UMB are described in documents from an organization named "3rd Generation Partnership Project 2" (3GPP2). The techniques described in the embodiments of this disclosure may be used for the wireless networks and radio technologies mentioned above as well as other wireless networks and radio technologies. The beam failure detection methods described herein may be described using terms generally associated with 3G and/or 4G wireless technologies, but aspects of the present application may be applied in other generations of communication systems (e.g., 5G and next generation communication technology) including NR technologies.

Figure 2:
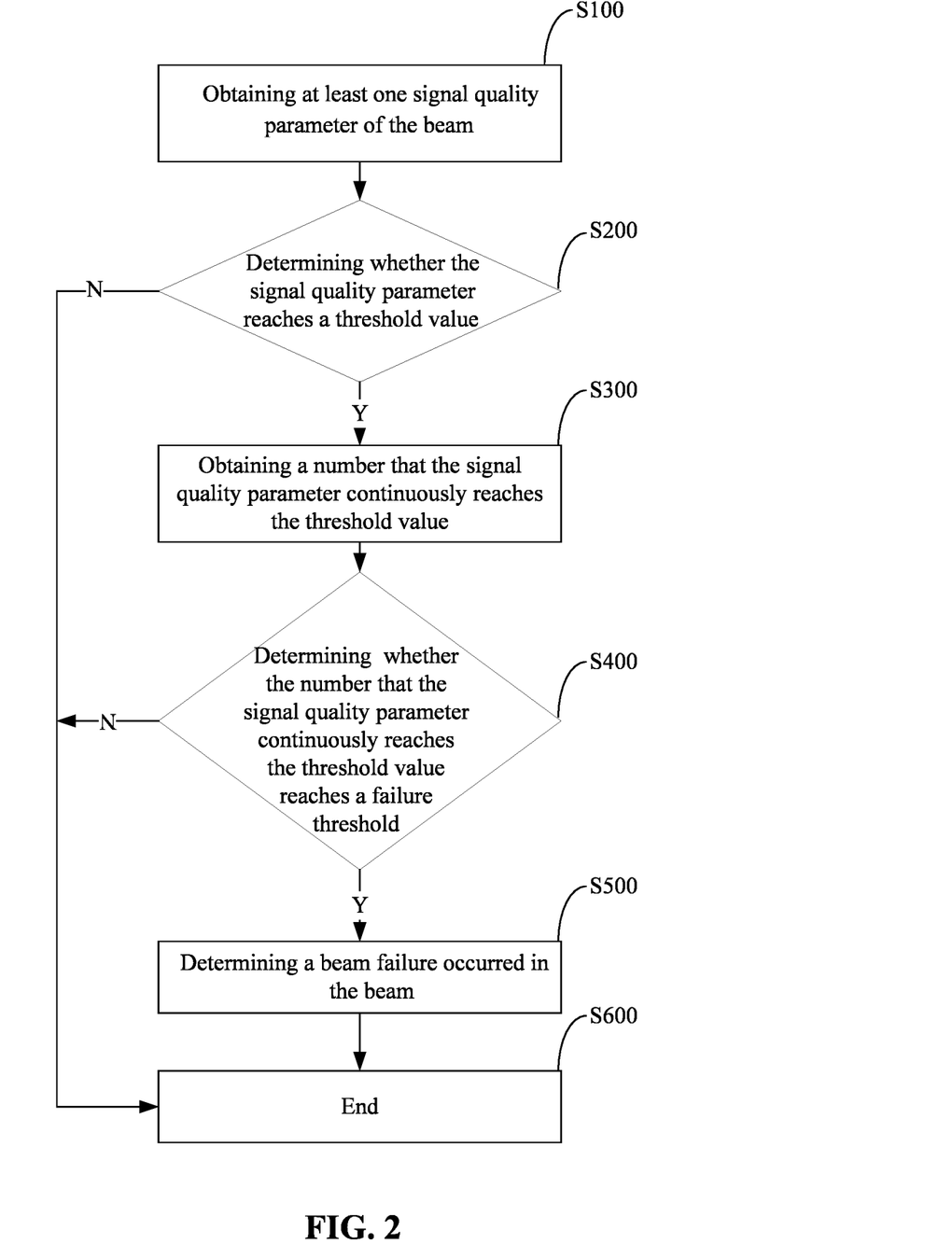
FIG. 2 is a flowchart of an embodiment of a method for detecting failure of beamed signals according to the present disclosure.
Figure 3:
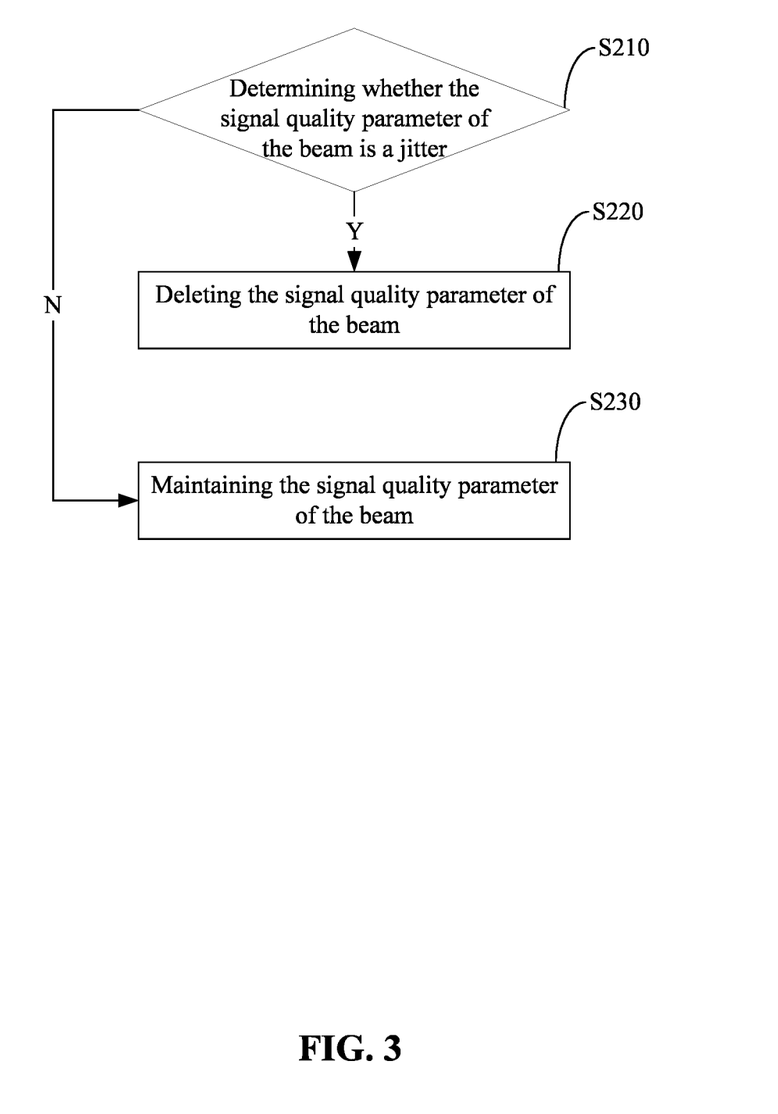
FIG. 3 is a flowchart of another embodiment of a method for detecting beam failure according to the present disclosure.

FIG. 2 illustrates a flowchart of an embodiment of the method for detecting beam failure. The embodiment is provided by way of example, as there are a variety of ways to carry out the method. The method includes obtaining at least one signal quality parameter of the beam, determining whether the signal quality reaches a threshold value, obtaining the number of times that the signal quality falls below the threshold value, determining whether the number of times that the signal quality falls below the threshold value reaches a failure threshold, and thus determining that a beam failure occurred in the beam. The method described below can be carried out using the configurations illustrated in FIG. 1, for example, and various elements of these figures are referenced in explaining the embodiment. Each block shown in FIG. 3 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S100.

At block S100, after the user equipment 20 establishes connection with the base station 10, the user equipment 20 analyzes the signal of the beam 11 to obtain the signal quality of the beam 11.

In one embodiment of the present disclosure, the signal quality includes reference signal receiving power (RSRP) or synchronization signal and PBCH block (SSB).

In one embodiment of the present disclosure, the user equipment 20 measures or detects SSB or RSRP periodically during a communication process with the base station 10. Therefore, by using the beam failure detection method provided in the present disclosure, the user equipment 20 can detect the beam failure by detecting the beam signal quality between the user equipment 20 and the base station. The user equipment 20 does not need an extra processer or a signal transceiving module to perform the beam failure detection, which reduces the power cost of the user equipment 20 and decreases the signaling overhead of the user equipment 20 during the beam failure detection.

At block S200, the user equipment 20 is configured for determining whether the signal quality reach a threshold value. If the signal quality reaches the threshold value, the method performs process S300. If the signal quality does not reach the threshold value, the method performs process S600.

In one embodiment of the present disclosure, the communication quality may include jitter between the user equipment 20 and the base station 10. Setting the threshold value can filter out normal jitters of the signal quality of the beam 11, which avoids interference of the beam failure detection due to normal jitters of the beam 11. Setting the threshold value can reduce the signaling overhead caused by a frequent interference of the beam failure detection during the communication of user equipment 20.

At block S300, the user equipment 20 is configured for obtaining a number that the signal quality parameter continuously reaches the threshold value.

In one embodiment of the present disclosure, the user equipment 20 collects the number that the signal quality parameter continuously reaches the threshold value. The user equipment 20 obtains quality of every signal and starts counting the number of times that the signal quality fail to reach the threshold value. The user equipment 20 clears the number of times counted that the signal quality does not reach the threshold value and starts recounting number of times that the signal quality reaches the threshold value. If the user equipment 20 only counts the number of times that the threshold value is reached, this may cause a misdetermination, which leads to an increase of the signaling overhead of the user equipment 20.

At block S400, the user equipment 20 is configured for determining whether the number of times that the signal quality parameter continuously reaches the threshold value reaches a failure threshold.

In one embodiment of the present disclosure, if the number of times that the signal quality parameter continuously reaches the threshold value reaches a failure threshold, the user equipment 20 performs step S500. If the number of times that the signal quality continuously reaches the threshold value does not reach the failure threshold, the user equipment 20 performs step S600 since current communication is normal.

In one embodiment of the present disclosure, the user equipment 20 can obtain the number of times that the signal quality parameter reaches the threshold and can set a default number of times. If the number of times that the signal quality reaches the threshold reaches a certain number within the default time, the user equipment 20 performs step S500. If the number of times that the signal quality parameter reaches the threshold does not reach a certain number within the default time, the user equipment 20 performs step S600 since current communication is normal.

At block S500, the user equipment 20 is configured for determining that the beam 11 is failed.

In one embodiment of the present disclosure, the user equipment 20 determines that the beam 11 is failed when the number of times that the signal quality continuously reaches the threshold value reaches the failure threshold.

At block S600, the user equipment 20 is configured for ceasing to detect beam failure.

In one embodiment of the present disclosure, the user equipment 20 ends the beam failure detection if there is no failure in the beam 11.

FIG. 3 illustrates a flowchart of an embodiment of substep of the step S200 in FIG. 2. The embodiment is provided by way of example, as there are a variety of ways to carry out the method. The method includes determining whether the signal quality contains jitter, deleting the signal quality if jitter is included, maintaining the signal quality if jitter is not included. The method described below can be carried out using the configurations illustrated in FIG. 1 for example, and various elements of these figures are referenced in explaining the embodiment. Each block shown in FIG. 3 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. This method can begin at block S210.

At block S210, the user equipment 20 is configured for determining whether the signal quality parameter of the beam 11 is a jitter of the beam 11. If the user equipment 20 determines that signal quality parameter of the beam 11 is a jitter, the user equipment performs step S220. If the user equipment 20 determines that signal quality parameter of the beam 11 is not a jitter, the user equipment performs step S230.

At block S220, the user equipment 20 is configured for deleting the signal quality parameter of the beam 11.

In one embodiment of the present disclosure, the user equipment 20 deletes the signal quality parameter of the beam 11 if the signal quality parameter is determined as the jitter of the beam 11.

In one embodiment of the present disclosure, the user equipment 20 can avoid the frequent start of the beam failure detection and reduce the power consumption and signaling overhead of the user equipment 20 by deleting the quality parameter determined as the jitter of the beam 11.

At block S230, the user equipment 20 is configured for maintaining the signal quality parameter of the beam 11.

In one embodiment of the present disclosure, if the signal quality parameter is determined as a beam failure, the user equipment 20 maintains the signal quality parameter of the beam 11 and perform step S300.

In one embodiment of the present disclosure, the user equipment 20 can avoid the effective value from being deleted by screening the jitter of the beam 11, which not only reduces the misjudgment of signal failure detection, but also ensures the correctness of the judgment results.

In one embodiment of the present disclosure, the determining parameters of determining the jitter of the beam 11 including reference receiving power $R_{th}$, current signal quality parameter of the beam 11 $R_i$, former signal quality parameter of the beam 11 $R_{i-1}$, next signal quality parameter of the beam 11 $R_{i+1}$, and the jitter parameter of the beam 11 $m$. Wherein, the value of the jitter parameter m is chosen from [0,1]. The value of m can be adjusted according to the signal strength of the beam 11 and other parameters during the communication. The adjusting of m can increase or decrease the determining standard of the beam jitter according to the communication, which makes the judgment standard more consistent with the current working condition of user equipment 20.

In one embodiment of the present disclosure, the way of determining whether a signal quality parameter of the beam 11 is a jitter or not is: when formula (1), formula (2), and formula (3) are all met, the signal quality parameter of the beam 11 is judged as not a jitter.

$$R_{i-1} > R_{th} \tag{1}$$

$$R_i < (1+m)*R_{th} \tag{2}$$

$$R_{i+1} > R_{th} \tag{3}$$

Figure 4:
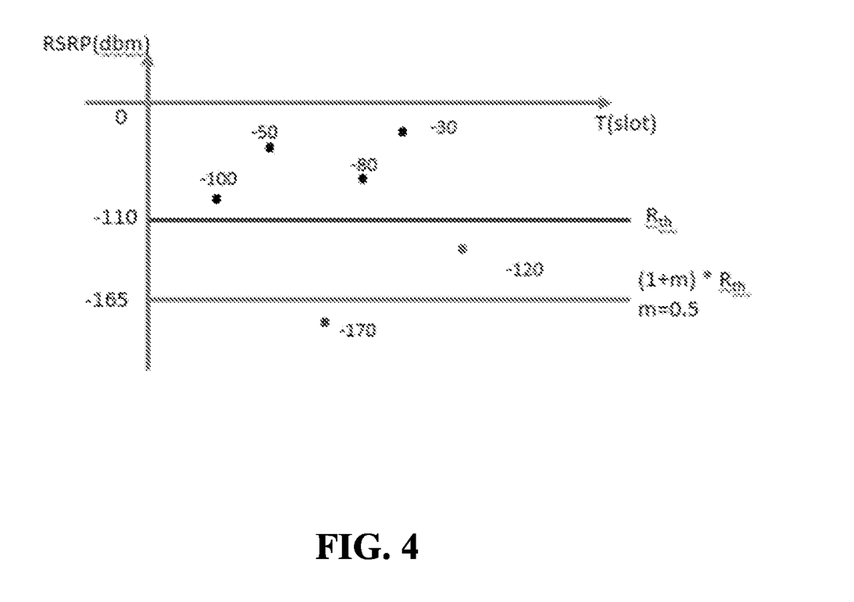
FIG. 4 is a diagram showing monitoring of reference signal receiving power (RSRP) according to the present disclosure.

FIG. 4 illustrates a diagram of RSRP monitoring data to one embodiment of the present disclosure.

Figure 5:
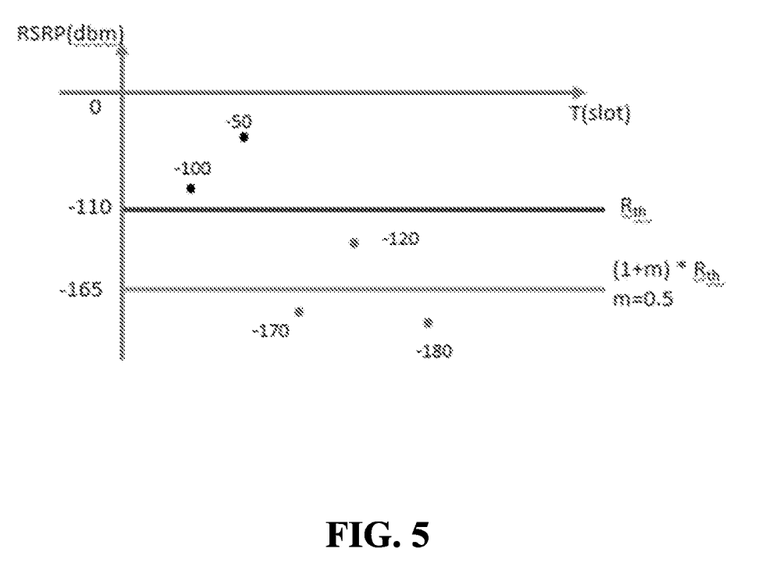
FIG. 5 is a diagram showing RSRP monitored according to the present disclosure.

FIG. 5 illustrates a diagram of RSRP monitoring data to another embodiment of the present disclosure.

As shown in FIG. 4 and FIG. 5, the signal quality parameter of the beam 11 is taken as the RSRP as an example. The formulas (1)-(3) are used to describe the method of removing jitter of the beam 11.

In one embodiment of the present disclosure, the RSRP is set as −110 dbm, which is the $R_{th}$ is set as −110 dbm. The value of the jitter parameter m is set as 0.5. According to the formula (2), the RSRP over $(1+m)*R_{th}$ is −165 dbm.

In one embodiment of the present disclosure, input the data −50 dbm, −170 dbm, and −80 dbm shown in FIG. 4 as $R_{i-1}$, $R_i$, and, $R_{i+1}$. Which is current signal quality parameter of the beam 11 $R_i$ is −170 dbm, former signal quality parameter of the beam 11 $R_{i-1}$ is −50 dbm, next signal quality parameter of the beam 11 $R_{i+1}$ is −80 dbm. According to the formula (1) to (3), the R_(i+1)>R_th, which suggests that the $R_i$ in FIG. 4 meets the formula (1) to (3), therefore, the −170 dbm in FIG. 4 would be noted as a jitter of the beam 11 rather than a value reaches the threshold.

In one embodiment of the present disclosure, input the data −170 dbm, −120 dbm, and −180 dbm shown in FIG. 5 as $R_{i-1}$, $R_i$, and, $R_{i+1}$. Which is current signal quality parameter of the beam 11 $R_i$ is −120 dbm, former signal quality parameter of the beam 11 $R_{i-1}$ is −170 dbm, next signal quality parameter of the beam 11 $R_{i+1}$ is −180 dbm. According to the formula (1) to (3), the R_(i+1)<R_th, which suggests that the $R_i$ in FIG. 5 does not meet the formula (3), therefore, the −120 dbm in FIG. 5 would be noted as a value reaches the threshold.

In one embodiment of the present disclosure, adding the jitter judgment in the method of detecting signal failure of the beam 11 can retain effective data reaching the threshold value and filter out the jitter of beam 11, avoiding the frequent start of the beam failure detection.

In one embodiment of the present disclosure, the value of $R_{th}$ equal to −110 dbm is from the new ratio technology to determine the district with strongest signal. In other embodiments, the value of $R_{th}$ can be adjusted according to the signal strength received by the user equipment 20.

In one embodiment of the present disclosure, the parameters of determining failure threshold including measuring a period of the signal quality parameter of the beam 11 T, data flow of the beam 11 S, the signal quality parameter continuously reaches the threshold value N, and the minimum number of reaching the failure threshold $N_{min}$. Wherein, the data flow of the beam 11 is negatively correlated with the upstream and downstream data volume when the user equipment communicates. The method of determining the failure threshold is the number meets formula (4) and formula (5).

$$N < \frac{S}{T} \quad (4)$$

$$\text{Max}(N, N_{min}) \quad (5)$$

In one embodiment of the present disclosure, take the signal quality parameter is RSRP for example, in combined with formula (4) and formula (5), to describe whether the number that the signal quality parameter continuously reaches the threshold value reaches the failure threshold.

In one embodiment of the present disclosure, setting the value N according to S and T. The failure detection of beam 11 may be frequently started if the value of N is too small. Therefore, a minimum value $N_{min}$ of the failure threshold, after obtaining the value N, compare $N_{min}$ with N, choosing the larger one as the failure threshold.

Figure 6:
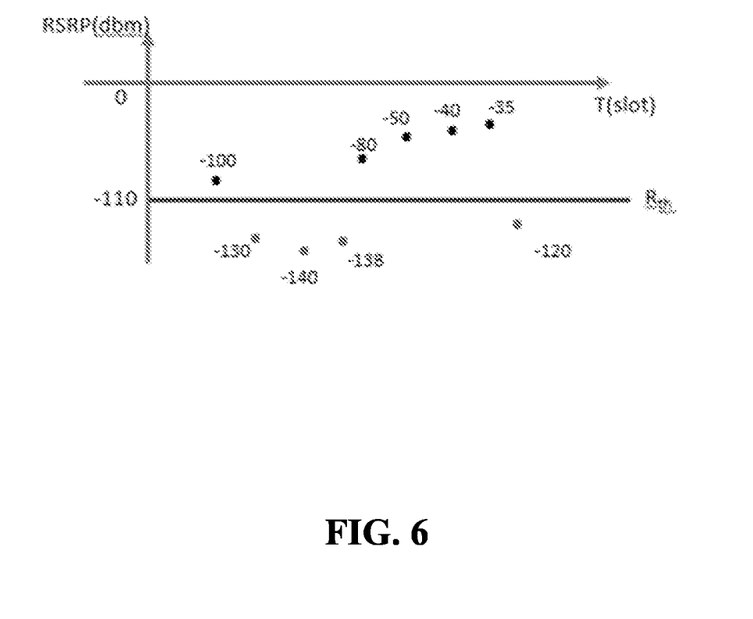
FIG. 6 is a diagram showing RSRP monitored according to the present disclosure.

FIG. 6 illustrates a diagram of RSRP monitoring data to one embodiment of the present disclosure.

Figure 7:
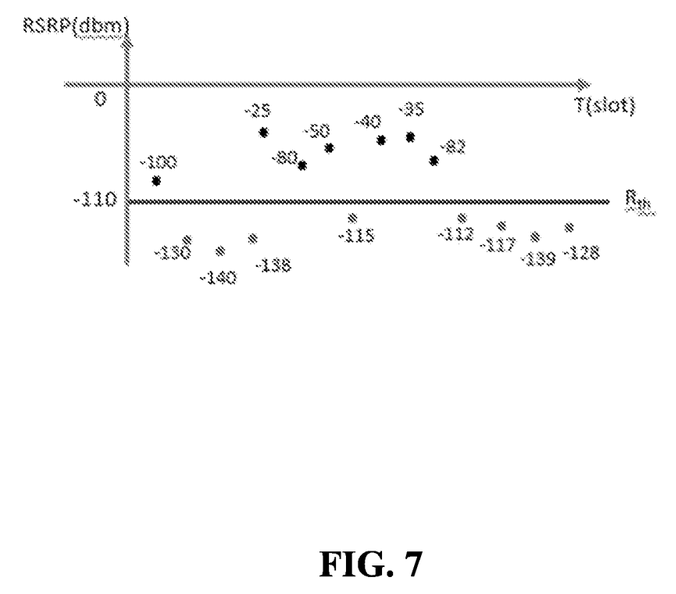
FIG. 7 is a diagram showing RSRP monitored according to the present disclosure.

FIG. 7 illustrates a diagram of RSRP monitoring data to one embodiment of the present disclosure.

As shown in FIG. 6, take the failure threshold is 4 for example. If the failure threshold is set as discontinuous, the signal strength between N−1th and Nth signal is acceptable but the beam failure detection started due to the unacceptable performance of former signal quality of the beam 11, which increases signaling overhead and leads to a low network speed of the user equipment 20.

As shown in FIG. 7, the fourth number that reaches the threshold value would not start the signal failure detection of the beam 11, only the fourth signal quality parameter continuously reaches the threshold value would start the signal failure detection.

Figure 8:
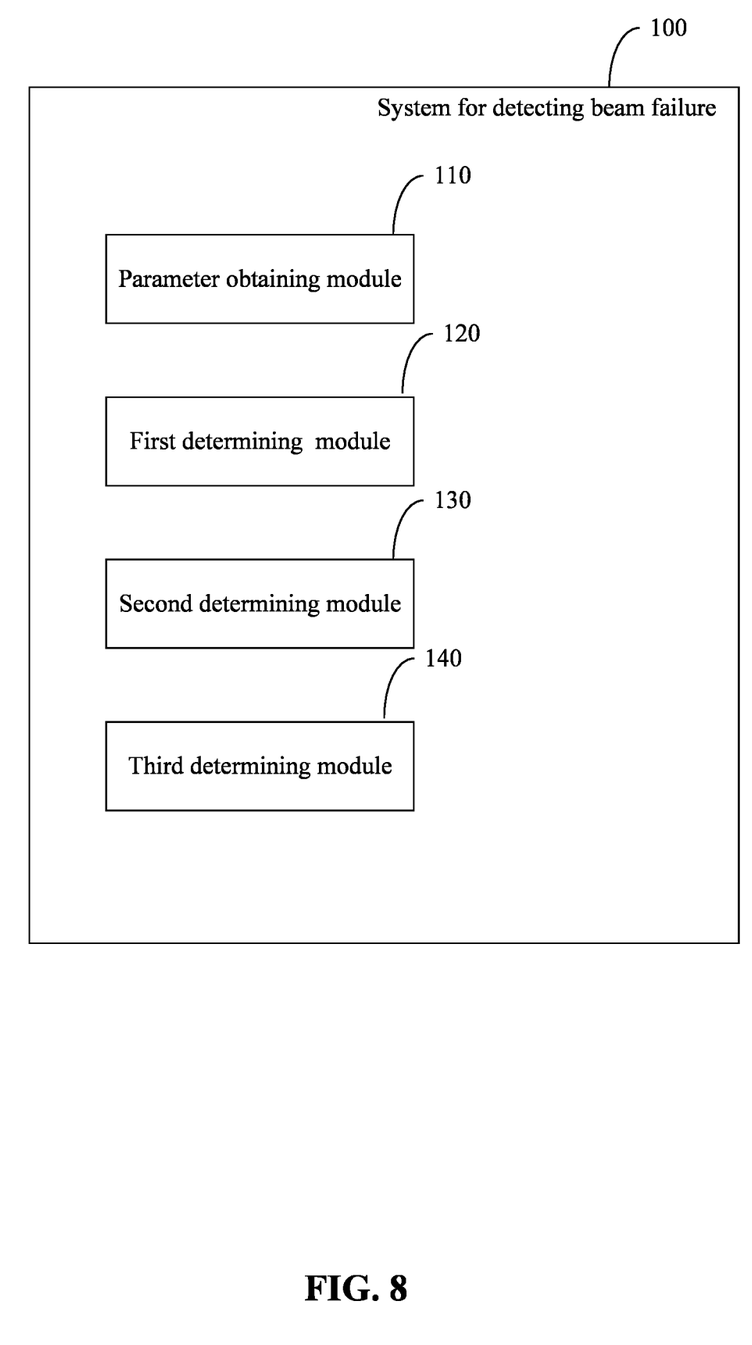
FIG. 8 is a diagram of an embodiment of a system for detecting beam failure according to the present disclosure.

FIG. 8 illustrates a system for detecting beam failure 100 to one embodiment of the present disclosure. As shown in FIG. 8, the system for detecting beam failure 100 includes a parameter obtaining module 110, a first determining module 120, a second determining module 130, and a third determining module 140.

In one embodiment of the present disclosure, the parameter obtaining module 110 is configured for obtaining the signal quality parameter of the beam. The parameter obtaining module 110 is also configured for performing the step S100 and can be referred to in conjunction with FIG. 2 and is not described herein again.

In one embodiment of the present disclosure, the first determining module 120 is configured for determining whether the signal quality parameter reaches the threshold value. The first determining module 120 is also configured for performing the step S200, the step S210 to S230 and can be referred to in conjunction with FIG. 2, and FIG. 3 and is not described herein again.

In one embodiment of the present disclosure, the second determining module 130 is configured for determining whether the number that the signal quality parameter continuously reaches the threshold value reaches the failure threshold when the signal quality parameter reaches the threshold value. The second determining module 130 is also configured for performing the step S400 and can be referred to in conjunction with FIG. 2 and is not described herein again.

In one embodiment of the present disclosure, the third determining module 140 is configured for determining the current beam has the beam failure when the number that the signal quality parameter continuously reaches the threshold value reaches the failure threshold. The third determining module 140 is also configured for performing the step S500 and can be referred to in conjunction with FIG. 2 and is not described herein again.

Figure 9:
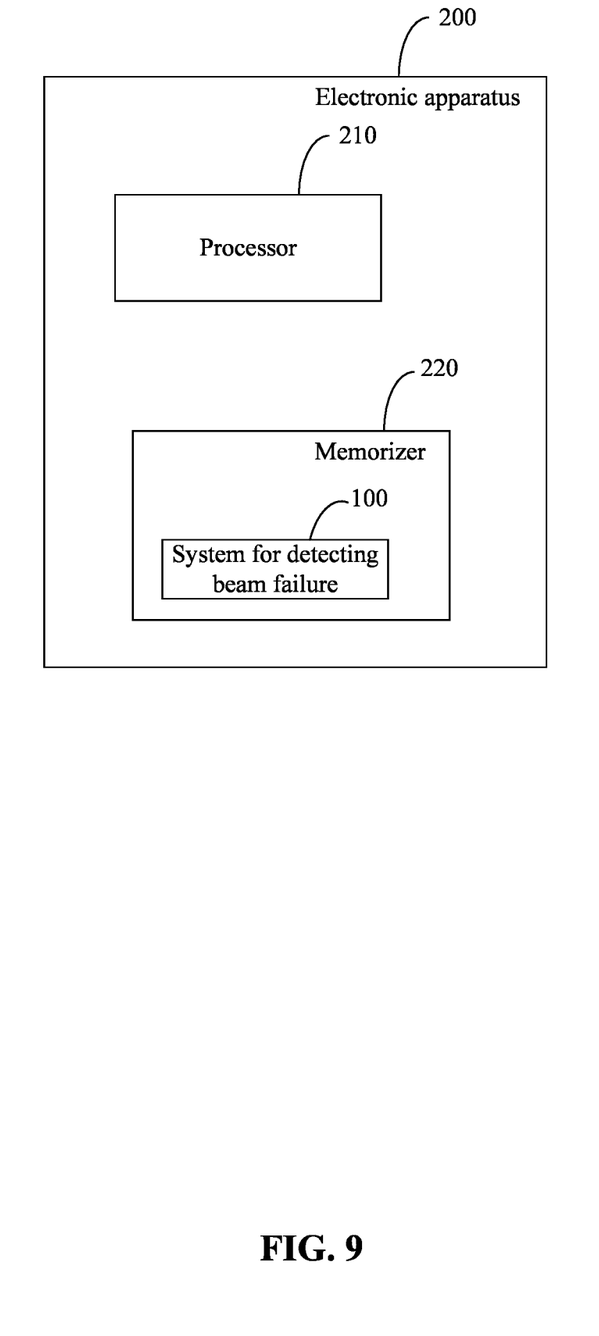
FIG. 9 is a diagram of an embodiment of an electronic apparatus according to the present disclosure.

FIG. 9 illustrates an electronic apparatus 200 to one embodiment of the present disclosure. As shown in FIG. 9, the electronic apparatus 200 includes a processor 210 and a memorizer 220. The memorizer 220 is configured for store a computer program. The processor 210 is configured for controlling the memorizer 220 to perform the computer program stored in the memorizer 220 to achieve the steps S100 to S600 and the steps S210 to S230. can be referred to in conjunction with FIG. 2, and FIG. 3 and is not described herein again.

In one embodiment of the present disclosure, the processor 210 is configured for perform communication of the electronic apparatus 200. The beam failure detection is achieved by the system for detecting beam failure 100 stored in memorizer 220.

In one embodiment of the present disclosure, beneficial effects of the electronic apparatus 200 can be referred to in conjunction with FIG. 2, FIG. 3, and FIG. 8 and is not described herein again.

Those skilled in the art should understand that the above modules or steps of the invention can be realized by a general computing device, which can be concentrated on a single computing device or distributed on a network composed of multiple computing devices. Alternatively, they can be realized by the program code executable by the computing device, so that they can be stored in the storage device and executed by the computing device. In some cases, the steps shown or described can be performed in a different order, or they can be made into individual integrated circuit modules, or multiple modules or steps of them can be made into a single integrated circuit module. Thus, the disclosure is not limited to any specific combination of hardware and software.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for detecting beam failure applied to a user equipment, the method comprising:
    obtaining at least one signal quality parameter of a beam;
    determining whether the signal quality parameter reaches a threshold value;
    if the signal quality parameter reaches the threshold value, determining whether the signal quality parameter reaches a failure threshold; and
    if the at least one signal quality parameter reaches the failure threshold, determining that a beam failure occurred in the beam;
    wherein the determining of whether the signal quality parameter reaches the threshold value, comprises:
    determining whether the signal quality parameter reaches the threshold value is due to a jittering of the beam;
    if the signal quality parameter reaches the threshold value is due to the jittering of the beam, deleting the signal quality parameter.

2. The method of claim 1, wherein the determining whether the signal quality parameter reaches the failure threshold, comprises:
  counting a number that the signal quality parameter reaches the threshold value within a default time;
  if the number that the signal quality parameter reaches the threshold value reaches a preset number, determining that the signal quality parameter reaches the threshold value.

3. The method of claim 1, wherein the determining of whether the signal quality parameter reaches the failure threshold, comprises:
  counting a number that the signal quality parameter continuously reaches the threshold value;
  if the number that the signal quality parameter continuously reaches the threshold value reaches the failure threshold, determining that the beam occurred a beam failure.

4. The method of claim 1, wherein the at least one signal quality parameter comprises a reference signal receiving power and a synchronization signal and PBCH block.

5. The method of claim 1, wherein the at least one signal quality parameter to determine the beam failure comprises a reference receiving power $R_{th}$, a current signal quality parameter of the beam $R_i$, a former signal quality parameter of the beam $R_{i-1}$, a next signal quality parameter of the beam $R_{i+1}$, and a jitter parameter of the beam m, wherein, the value of the jitter parameter m is chosen from [0,1].

6. The method of claim 5, wherein the determining whether the signal quality parameter reaches the threshold value is due to the jittering of the beam, comprises:
  if the signal quality parameter meets $R_{i-1}>R_{th}$, $R_i<(1+m)*R_{th}$, and $R_{i+1}>R_{th}$, determining that the beam failure is not due to a jittering of the beam.

7. The method of claim 3, wherein the signal quality parameter of determining the beam failure comprises a time period of the signal quality parameter of the beam T, a data flow of the beam S, the signal quality parameter continuously reaches the threshold value N, and a minimum number of reaching the failure threshold $N_{min}$.

8. The method of claim 7, wherein the method comprising determining the failure threshold;
  the determining the failure threshold, comprises:
  if
  $$N < \frac{S}{T},$$
  setting the signal quality parameter continuously reaches the threshold value N as the failure threshold.

9. The method of claim 8, wherein if $N<N_{min}$, setting the threshold value as $N_{min}$.

10. A system for detecting beam failure applied to a user equipment, the system comprising:
  a processor configured to:
  obtain at least one signal quality parameter of a beam;
  determine whether the signal quality parameter reaches a threshold value;
  if the signal quality parameter reaching the threshold value, determine whether the signal quality parameter reaches a failure threshold, and determine whether the signal quality parameter reaches the threshold value is a jitter of the beam; if the signal quality parameter reaches the threshold value is due to a jittering of the beam, delete the signal quality parameter; and
  if the signal quality parameter reach the failure threshold, determine that a beam failure occurred in the beam.

11. The system for detecting beam failure of claim 10, wherein the processor is further configured to:
  count a number that the signal quality parameter reaches the threshold value within a default time;
  if the number that the signal quality parameter reaches the threshold value reaches a preset number, determine that the signal quality parameter reaches the threshold value.

12. The system for detecting beam failure of claim 10, wherein the processor is further configured to:
  count a number that the signal quality parameter continuously reaches the threshold value;
  if the number that the signal quality parameter continuously reaches the threshold value reaches the failure threshold, determine that a beam failure occurred in the beam.

13. The system for detecting beam failure of claim 10, wherein the at least one signal quality parameter further comprises a reference signal receiving power and a synchronization signal and PBCH block.

14. The system for detecting beam failure of claim 10, wherein the at least one signal quality parameter to determine the beam failure further comprises: a reference receiving power $R_{th}$, current signal quality parameter of the beam $R_i$, former signal quality parameter of the beam $R_{i-1}$, a next signal quality parameter of the beam $R_{i+1}$, and a jitter parameter of the beam m, wherein, the value of the jitter parameter m is chosen from [0,1].

15. The system for detecting beam failure of claim 14, wherein the processor is further configured to determine whether the signal quality parameter reaches the threshold value is the jitter of the beam, comprises:
  if the signal quality parameter meets $R_{i-1}>R_{th}$, $R_i<(1+m)*R_{th}$, and $R_{i+1}>R_{th}$, determine that the beam failure is judged as not due to a jittering of the beam.

16. The system for detecting beam failure of claim 12, wherein the parameter of determining the beam failure further comprises a time period of the signal quality parameter of the beam T, a data flow of the beam S, the signal quality parameter continuously reaches the threshold value N, and a minimum number of reaching the failure threshold $N_{min}$.

17. The beam failure detecting method of claim 16, wherein the processor is further configured for determining the failure threshold;
  wherein the determining the failure threshold, comprises:
  if
  $$N < \frac{S}{T},$$
  set the signal quality parameter continuously reaches the threshold value N as the failure threshold,
  if $N<N_{min}$, set the threshold value as $N_{min}$.

18. An electronic apparatus of detecting beam failure, comprising:
  a non-transitory memory storage;
  a processor; and
  one or more computer programs, wherein the one or more computer programs are stored in the non-transitory memory storage and configured to be executed by the processor, the one or more computer programs including instructions for:

obtain at least one signal quality parameter of a beam;
determine whether the signal quality parameter reaches a threshold value;
if the signal quality parameter reaching the threshold value, determine whether the signal quality parameter reaches a failure threshold;
if the signal quality parameter reaching a failure threshold, determine that a beam failure occurred in the beam;
wherein the determining of whether the signal quality parameter reaches value is due to a jittering of the beam;
if the signal quality parameter reaches the threshold value is due to the jittering of the beam, deleting the signal quality parameter.

* * * * *